US011947750B2

United States Patent
Ohue et al.

(10) Patent No.: US 11,947,750 B2
(45) Date of Patent: *Apr. 2, 2024

(54) DISPLAY DEVICE WITH SENSOR

(71) Applicant: Japan Display Inc., Tokyo (JP)

(72) Inventors: Yoshihide Ohue, Tokyo (JP); Yukiya Hirabayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,869

(22) Filed: Jan. 19, 2023

(65) Prior Publication Data
US 2023/0152915 A1 May 18, 2023

Related U.S. Application Data

(63) Continuation of application No. 17/393,459, filed on Aug. 4, 2021, now Pat. No. 11,592,920, which is a (Continued)

(30) Foreign Application Priority Data

Mar. 22, 2019 (JP) ................................. 2019-055511

(51) Int. Cl.
G06F 3/041 (2006.01)
G06F 3/044 (2006.01)

(52) U.S. Cl.
CPC .......... G06F 3/0412 (2013.01); G06F 3/0443 (2019.05)

(58) Field of Classification Search
CPC .............................. G06F 3/0443; G06F 3/0412
(Continued)

(56) References Cited

U.S. PATENT DOCUMENTS 8,354,998 B2 1/2013 Liao et al.
11,592,920 B2 * 2/2023 Ohue .................... G06F 3/0412
(Continued)

FOREIGN PATENT DOCUMENTS

JP 2012-212076 A 11/2012
JP 2018-060156 A 4/2018
(Continued)

OTHER PUBLICATIONS

International Search Report issued in International Patent Application No. PCT/JP2020/010121 dated Apr. 7, 2020 and English translation of same. 5 pages.
(Continued)

*Primary Examiner* — Calvin C Ma
(74) *Attorney, Agent, or Firm* — K&L Gates LLP

(57) ABSTRACT

A display device with a sensor in which deterioration of display quality is suppressed even when sensor wires are superimposed on respective slits of detection electrodes disposed side by side. The display device includes detection electrodes, sensor wires, pixels, scanning lines, and signal lines on a first insulating substrate. The detection electrodes are arrayed in a matrix in first and second directions. The sensor wires and signal lines are disposed alternately in the first direction and provided on the same layer. Switching elements of two of the pixels disposed side by side in the first direction each are coupled to one of the signal lines, and the signal line is superimposed on the corresponding detection electrode that straddles the two pixels. The sensor wires are disposed between the two pixels disposed side by side and superimposed on the respective slits of the two detection electrodes disposed side by side.

15 Claims, 9 Drawing Sheets

Related U.S. Application Data continuation of application No. PCT/JP2020/010121, filed on Mar. 9, 2020.

(58) Field of Classification Search
USPC .......................................................... 345/173
See application file for complete search history.

(56) References Cited

U.S. PATENT DOCUMENTS

| | | |
|---|---|---|
| 2010/0020032 A1* | 1/2010 | Mamba ................. G06F 3/0447 |
| | | 345/173 |
| 2012/0249454 A1 | 10/2012 | Teraguchi et al. |
| 2016/0253024 A1 | 9/2016 | Aoyama et al. |
| 2018/0095583 A1 | 4/2018 | Kim et al. |
| 2019/0114023 A1 | 4/2019 | Gotoh et al. |
| 2020/0159354 A1 | 5/2020 | Yoshida |

FOREIGN PATENT DOCUMENTS

| | | |
|---|---|---|
| WO | WO2016136272 A1 | 9/2016 |
| WO | WO2018207660 A1 | 11/2018 |

OTHER PUBLICATIONS

Written Opinion issued in International Patent Application No. PCT/JP2020/010121 dated Apr. 7, 2020. 3 pages.

Office Action issued in related Indian Patent Application No. 202117041971 dated Sep. 9, 2022. 8 pages.

\* cited by examiner

DISPLAY DEVICE WITH SENSOR

CROSS-REFERENCE TO RELATED APPLICATION(S)

This application is a continuation of U.S. patent application Ser. No. 17/393,459 filed on Aug. 4, 2021, which is a continuation of PCT international application Ser. No. PCT/JP2020/010121 filed on Mar. 9, 2020 which designates the United States, incorporated herein by reference, and which claims the benefit of priority from Japanese Patent Application No. 2019-055511, filed on Mar. 22, 2019, incorporated herein by reference.

BACKGROUND

1. Technical Field

The present disclosure relates to a display device with a sensor.

2. Description of the Related Art

Japanese Patent Application Laid-open Publication No. 2018-060156 A describes a display device with a built-in touch screen. The display device with a built-in touch screen includes a plurality of detection electrodes and a plurality of sensor wires. The sensor wires are coupled to the detection electrodes.

In the technology of Japanese Patent Application Laid-open Publication No. 2018-060156 A (FIG. 4), the sensor wires are superimposed on the signal lines with an insulating layer interposed therebetween, the signal lines being configured to transmit the video data signals. The sensor wires are covered by the detection electrodes.

It is an object of the present disclosure to provide a display device with a sensor in which the degradation of display quality is suppressed even when the sensor wires are superimposed on slits of two detection electrodes disposed side by side.

SUMMARY

A display device with a sensor according to an embodiment comprising: a first substrate; a plurality of detection electrodes arrayed in a matrix (row-column configuration) in a first direction and a second direction intersecting the first direction above the first substrate; a plurality of sensor wires each coupled to the respective detection electrodes; a plurality of pixels each including a plurality of pixels and arrayed in a matrix (row-column configuration) in the first direction and the second direction; a plurality of scanning lines configured to scan switching elements of the pixels and extending in the first direction; and a plurality of signal lines coupled to the switching elements of the pixels and extending in the second direction, wherein the sensor wires and the signal lines are alternately disposed in the first direction and provided on the same layer, the switching elements of two of the pixels disposed side by side in the first direction each are coupled to one of the signal lines and the signal line is superimposed on the corresponding detection electrode that straddles the two pixels, and the sensor wires are disposed between the two pixels disposed side by side in the first direction and superimposed on respective slits of two of the detection electrodes disposed side by side in the first direction.

DETAILED DESCRIPTION OF THE PREFERRED EMBODIMENTS

Figure 1:
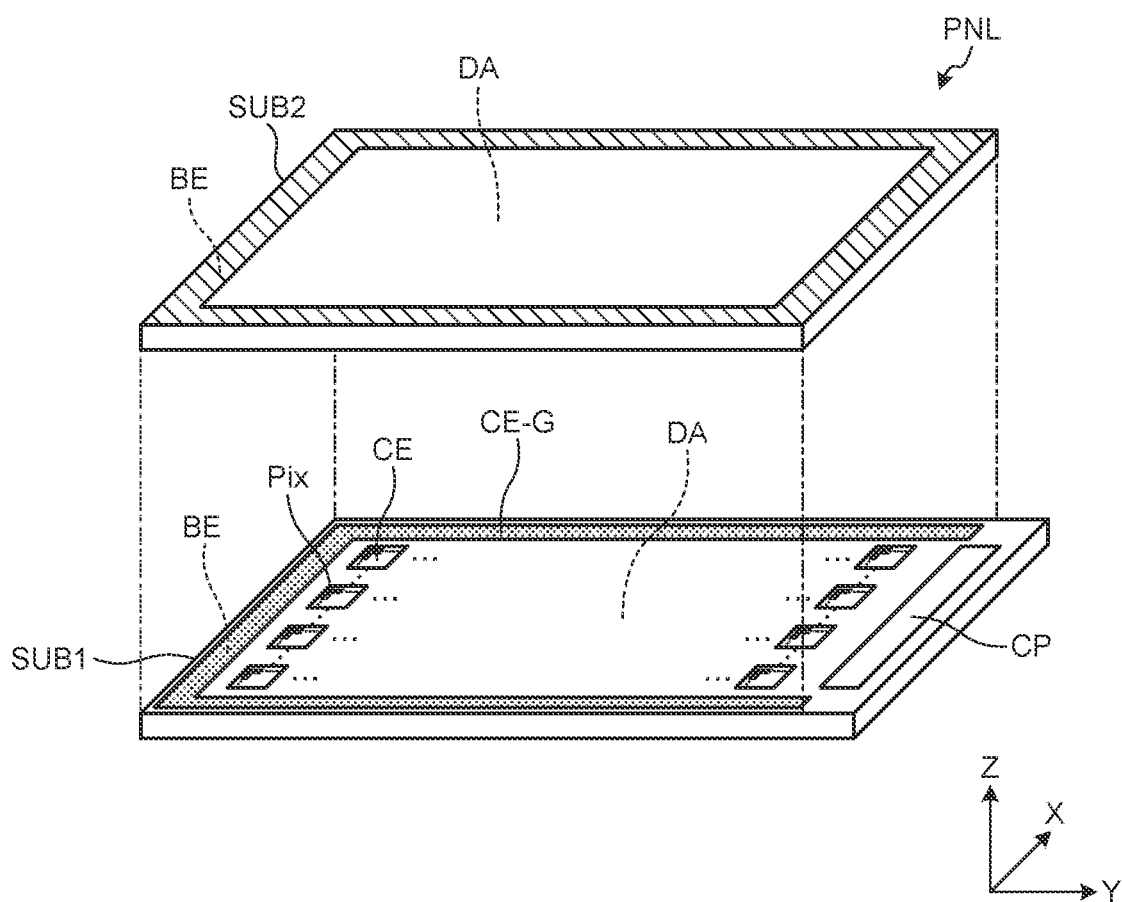
FIG. 1 is an exploded perspective view of a display device according to a present embodiment.

Exemplary aspects (embodiments) to embody the present disclosure are described below in greater detail with reference to the accompanying drawings. The contents described in the embodiment are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the gist of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and the detailed explanation thereof may be appropriately omitted.

FIG. 1 is an exploded perspective view of a display device according to a present embodiment. As illustrated in FIG. 1, a display device with a sensor PNL includes an array substrate SUB1 and a counter substrate SUB2. As illustrated in FIG. 1, in the display device with a sensor PNL, a peripheral region BE is provided outside a display region DA. While the display region DA has a rectangular shape, the outer shape of the display region DA is not particularly limited. The display region DA may have a cut-out or have another polygonal shape, for example. The display region DA may have another shape, such as a circular or elliptic shape.

A first direction X extends along the short side of the display region DA in the present embodiment. A second direction Y intersects (or is orthogonal to) the first direction X. The first direction X and the second direction Y are not limited thereto, and the second direction Y may intersect the first direction X at an angle other than 90 degrees. The plane defined by the first direction X and the second direction Y is parallel to the surface of the array substrate SUB1. A third direction Z orthogonal to the first direction X and the second direction Y is the thickness direction of the array substrate SUB1.

The display region DA is a region for displaying images and overlaps a plurality of pixels Pix. The peripheral region BE is positioned on the inner side than the outer periphery of the array substrate SUB1 and on the outer side than the display region DA. The peripheral region BE may have a frame shape surrounding the display region DA. In this case, the peripheral region BE may also be referred to as a frame region.

The display region DA that displays images includes a sensor region included in a detection device that detects capacitance. As illustrated in FIG. 1, a plurality of detection electrodes CE are arrayed in a matrix (row-column configuration) in the first direction X and the second direction Y in the display region DA. The detection electrodes CE each have a rectangular or square shape schematically in a plan view. The details in the shape of the detection electrodes CE will be described later. The detection electrodes CE are made of a translucent conductive material, such as indium tin oxide (ITO).

As illustrated in FIG. 1, the peripheral region BE on one surface of the array substrate SUB1 is provided with outer edge wiring CE-G and an integrated circuit CP. The outer edge wiring CE-G, for example, is provided continuously along the long sides and a short side of the display region DA and surrounds the display region DA.

The display device with a sensor PNL integrates the sensor region with the display region DA. Specifically, in the display device with a sensor PNL, parts of members in the display region DA serve as the detection electrodes CE in the sensor region.

Figure 2:
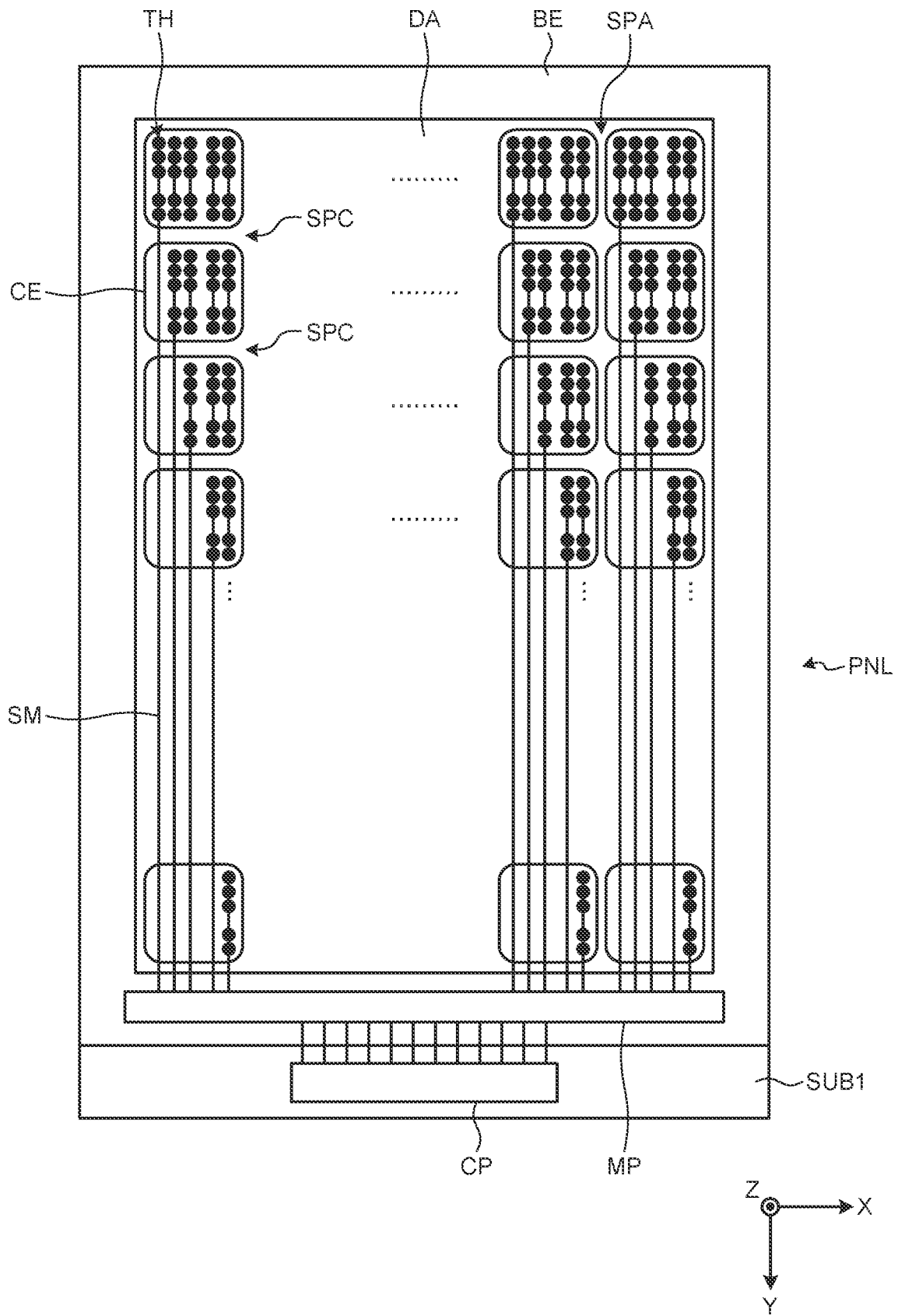
FIG. 2 is a plan view schematically illustrating an array substrate.

FIG. 2 is a plan view schematically illustrating the array substrate. As illustrated in FIG. 2, the detection electrodes CE are divided in a matrix (row-column configuration) in the first direction X and the second direction Y by slits SPA and SPB. A coupling circuit MP and the integrated circuit CP are provided on another short side of the peripheral region BE. A flexible substrate, which is not illustrated, is coupled to the other short side of the peripheral region BE. The positions of the coupling circuit MP and the integrated circuit CP are not limited thereto, and the circuits may be provided on a control substrate outside the module or the flexible substrate, for example.

The detection electrodes CE are electrically coupled to the integrated circuit CP via sensor wires SM and the coupling circuit MP. The sensor wires SM are electrically coupled to the respective detection electrodes CE disposed in the display region DA and drawn out to the peripheral region BE. The sensor wires SM extend along the second direction Y and are disposed side by side in the first direction X throughout the display region DA. A drive circuit included in the integrated circuit CP, for example, is coupled to the detection electrodes CE via the coupling circuit MP disposed in the peripheral region BE and the respective sensor wires SM.

Contact holes TH each have a base part (refer to FIG. 7) at which one of the detection electrodes CE and one of the sensor wires SM overlapping the detection electrode CE are electrically coupled. In FIG. 2, one of the sensor wires SM is schematically coupled to one of the detection electrodes CE.

The display device with a sensor PNL includes the coupling circuit MP. The coupling circuit MP is provided between the detection electrodes CE and the integrated circuit CP. The coupling circuit MP switches coupling and decoupling the detection electrodes CE to be a target of detection drive to and from the integrated circuit CP based on control signals supplied from the integrated circuit CP. The coupling circuit MP includes analog front ends.

Figure 3:
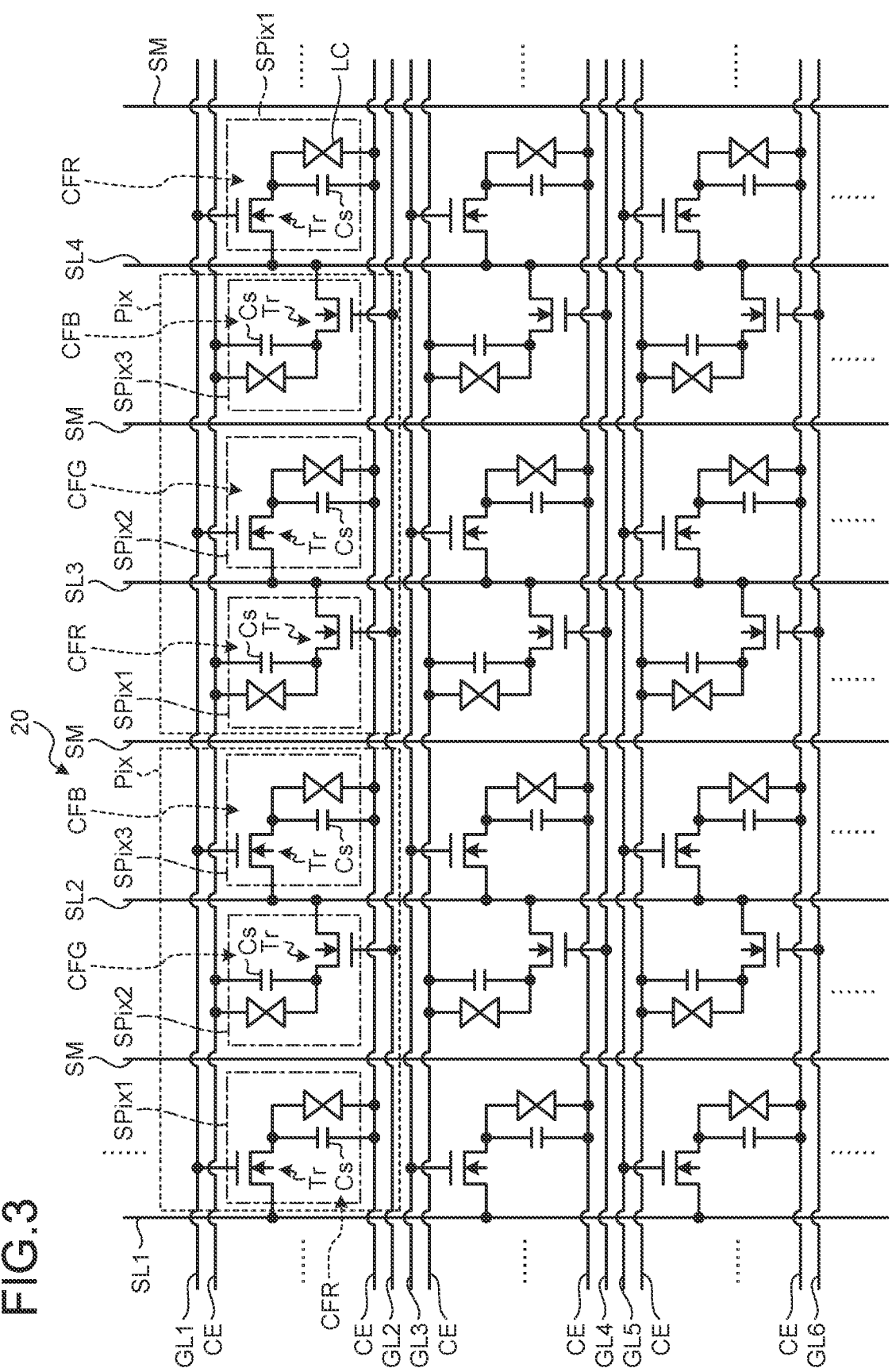
FIG. 3 is a circuit diagram of a pixel array in a display region according to the present embodiment.

FIG. 3 is a circuit diagram of a pixel array in the display region according to the present embodiment. In the following description, a plurality of scanning lines GL1, GL2, GL3, GL4, GL5, and GL6 may also be collectively referred to as scanning lines GL. The scanning lines GL extend in the first direction. A plurality of signal lines SL1, SL2, SL3, and SL4 may also be collectively referred to as signal lines SL. The signal lines SL extend in the second direction intersecting the first direction. The array substrate SUB1 is provided with switching elements Tr of sub-pixels SPix1, SPix2, and SPix3, the signal lines SL, the scanning lines GL, and other components illustrated in FIG. 3. The signal lines SL1 to SL4 are wires that supply pixel signals to pixel electrodes PE (refer to FIG. 4). The scanning lines GL1 to GL6 are wires that supply gate signals for driving the switching elements Tr.

As illustrated in FIG. 3, the pixels Pix in the display region DA illustrated in FIG. 1 each include the sub-pixels SPix1, SPix2, and SPix3 arrayed in a matrix (row-column configuration). In the following description, the sub-pixels SPix1, SPix2, and SPix3 may also be collectively referred to as sub-pixels SPix. The sub-pixels SPix1, SPix2, and SPix3 each include of the switching element Tr and the capacitance of a liquid crystal layer LC. The switching elements Tr are composed of thin-film transistors, and are composed of n-channel metal oxide semiconductor (MOS) TFTs in this example. A third insulating layer 13 (refer to FIG. 5) is provided between the pixel electrodes PE, which will be described later, and the detection electrodes CE, thereby forming holding capacitance Cs illustrated in FIG. 3.

Color filters CFR, CFG, and CFB illustrated in FIG. 3 are, for example, color regions in three colors of red (R), green (G), and blue (B) and are cyclically arrayed. The color regions in the three colors of R, G, and B forming one of sets are associated with the respective sub-pixels SPix1, SPix2, and SPix3 illustrated in FIG. 3. Each pixel Pix is composed of a set of the sub-pixels SPix1, SPix2, and SPix3 corresponding to the respective color regions in the three colors. The color filters may include color regions in four or more colors. The sub-pixels SPix1, SPix2, and SPix3 each may also be referred to as pixels.

As illustrated in FIG. 3, the signal line SL2 is shared by the sub-pixel SPix2 and the sub-pixel SPix3. The signal line SL3 is shared by the sub-pixel SPix1 and the sub-pixel SPix2. The signal line SL4 is shared by the sub-pixel SPix3 and the sub-pixel SPix1. The sub-pixels SPix in two rows share one of the signal lines SL means that the switching elements Tr of two sub-pixels SPix disposed side by side in the first direction are coupled to one of the signal lines SL.

Since the sub-pixels SPix included in two rows share one of the signal lines SL, the number of signal lines SL can be reduced. Therefore, one of the sensor wires SM extending in the same direction as the signal lines SL can be disposed between the two sub-pixels SPix1 and SPix2 between the signal line SL1 and SL2. Similarly, one of the sensor wires SM is disposed between the two sub-pixels SPix3 and SPix1 between the signal lines SL2 and SL3. Similarly, one of the sensor wires SM is disposed between the two sub-pixels SPix2 and SPix3 between the signal lines SL3 and SL4. As explained above, the sensor wires SM and the signal lines SL are disposed alternately in the first direction.

The sub-pixels SPix that are disposed side by side in the direction in which the scanning lines GL extend are coupled to different scanning lines GL. In FIG. 3, every other from the left, sub-pixels SPix1, SPix3, SPix2, and SPix1 are coupled to the scanning line GL1. Similarly, every other from the left, sub-pixels SPix2, SPix1, and SPix3 are coupled to the scanning line GL2.

For example, assume a case of driving the sub-pixels SPix1 to which the color filter CFR is assigned. A scanning line drive circuit (not illustrated) selects the scanning lines GL1 and GL2 simultaneously. Signals corresponding to red (R) gradation data of an image are transmitted to the signal lines SL1 and SL3.

Next, assume a case of driving the sub-pixels SPix2 to which the color filter CFG is assigned. The scanning line drive circuit (not illustrated) selects the scanning lines GL1 and GL2 simultaneously. Signals corresponding to green (G) gradation data of an image are transmitted to the signal lines SL2 and SL3.

Next, assume a case of driving the sub-pixels SPix3 to which the color filter CFB is assigned. The scanning line drive circuit (not illustrated) selects the scanning lines GL1 and GL2 simultaneously. Signals corresponding to blue (B) gradation data of an image are transmitted to the signal lines SL2 and SL4.

Next, the display device with a sensor PNL simultaneously selects the two scanning lines GL (scanning lines GL3 and GL4) of the next line to display the sub-pixels SPix of the next line. Thereafter the above-described driving is repeated.

Figure 4:
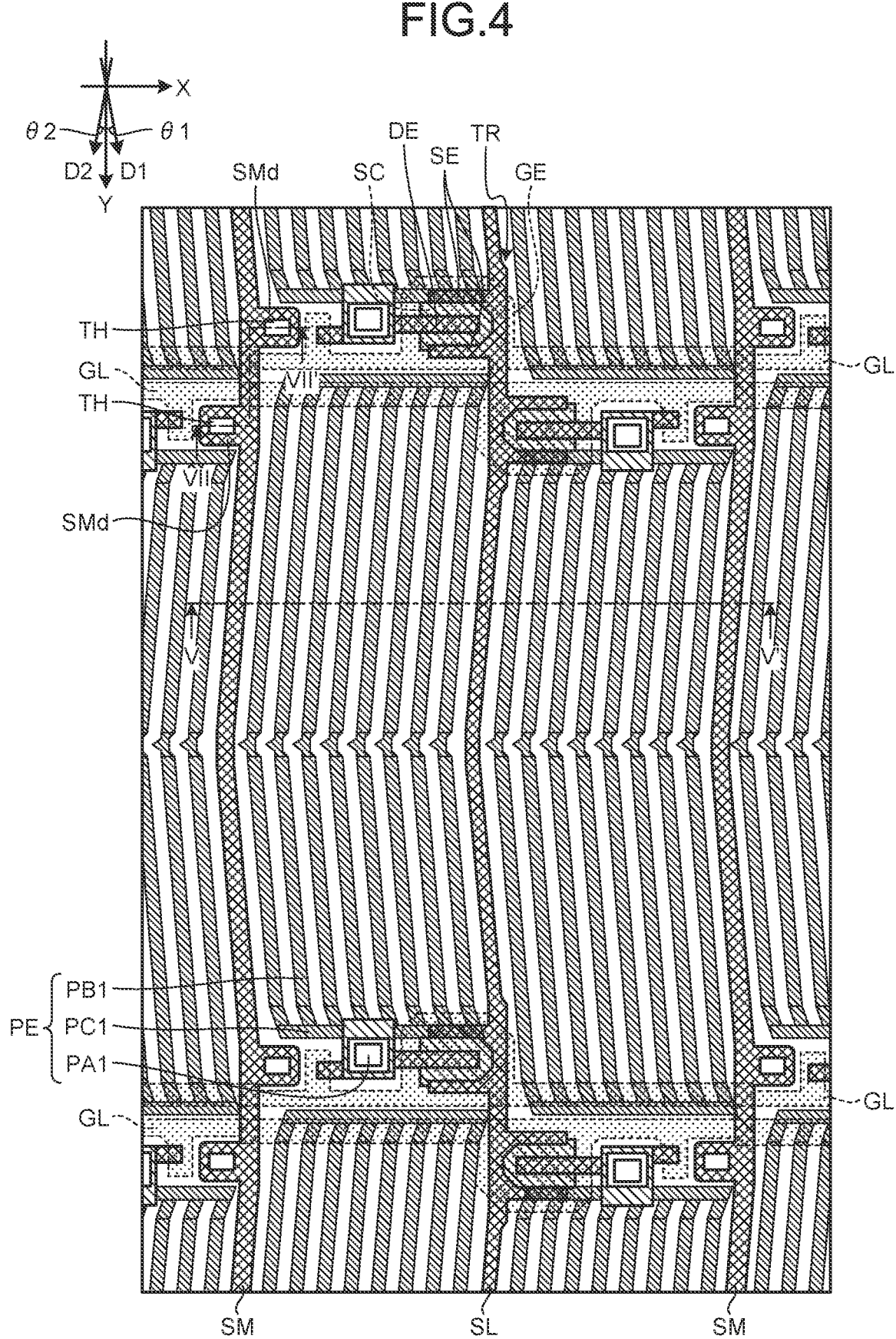
FIG. 4 is a plan view for explaining the positions of sensor wires and signal lines in a schematic plan view of pixels.
Figure 5:
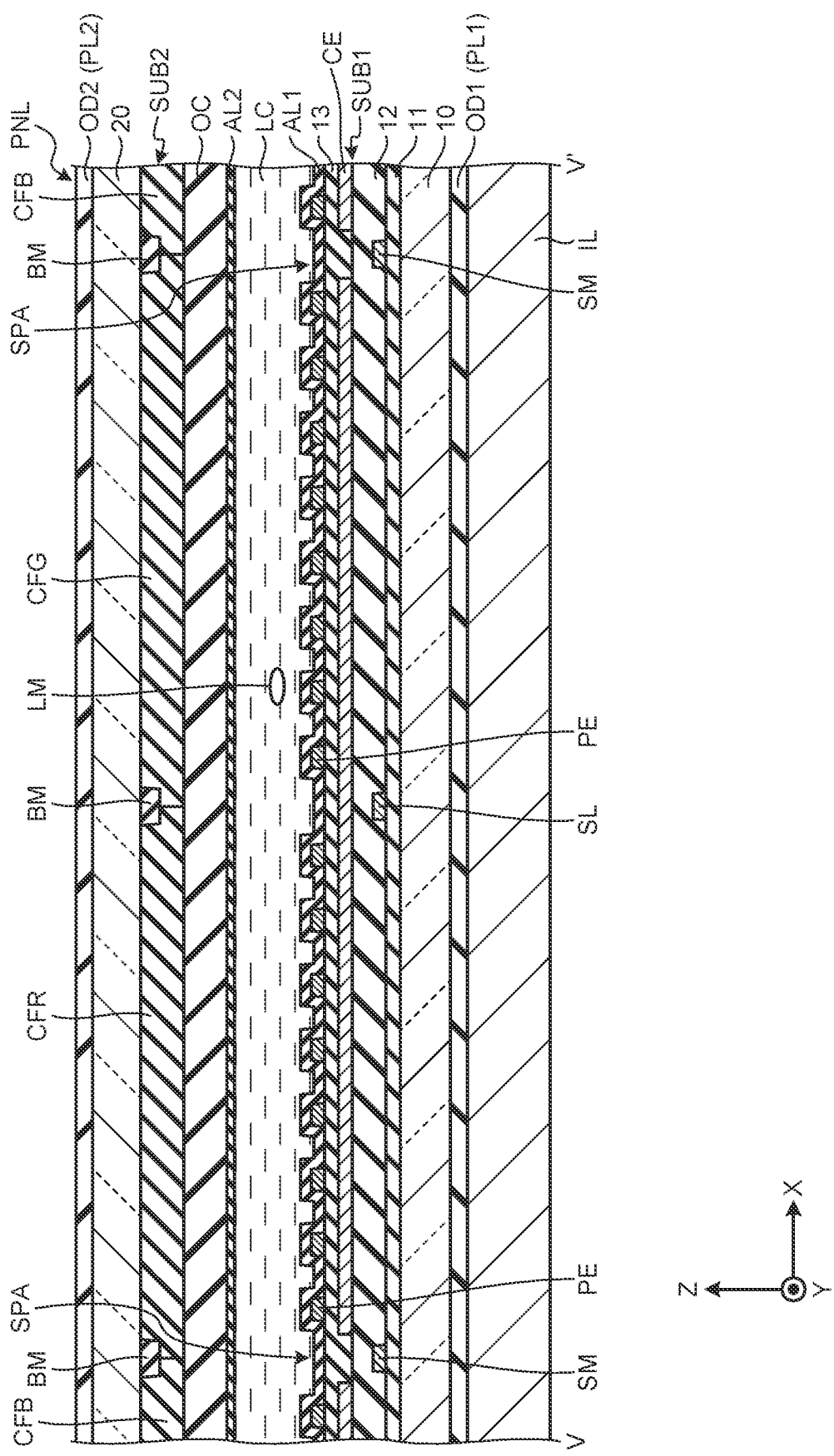
FIG. 5 is a partial sectional view for explaining the V-V' section in FIG. 4.
Figure 6:
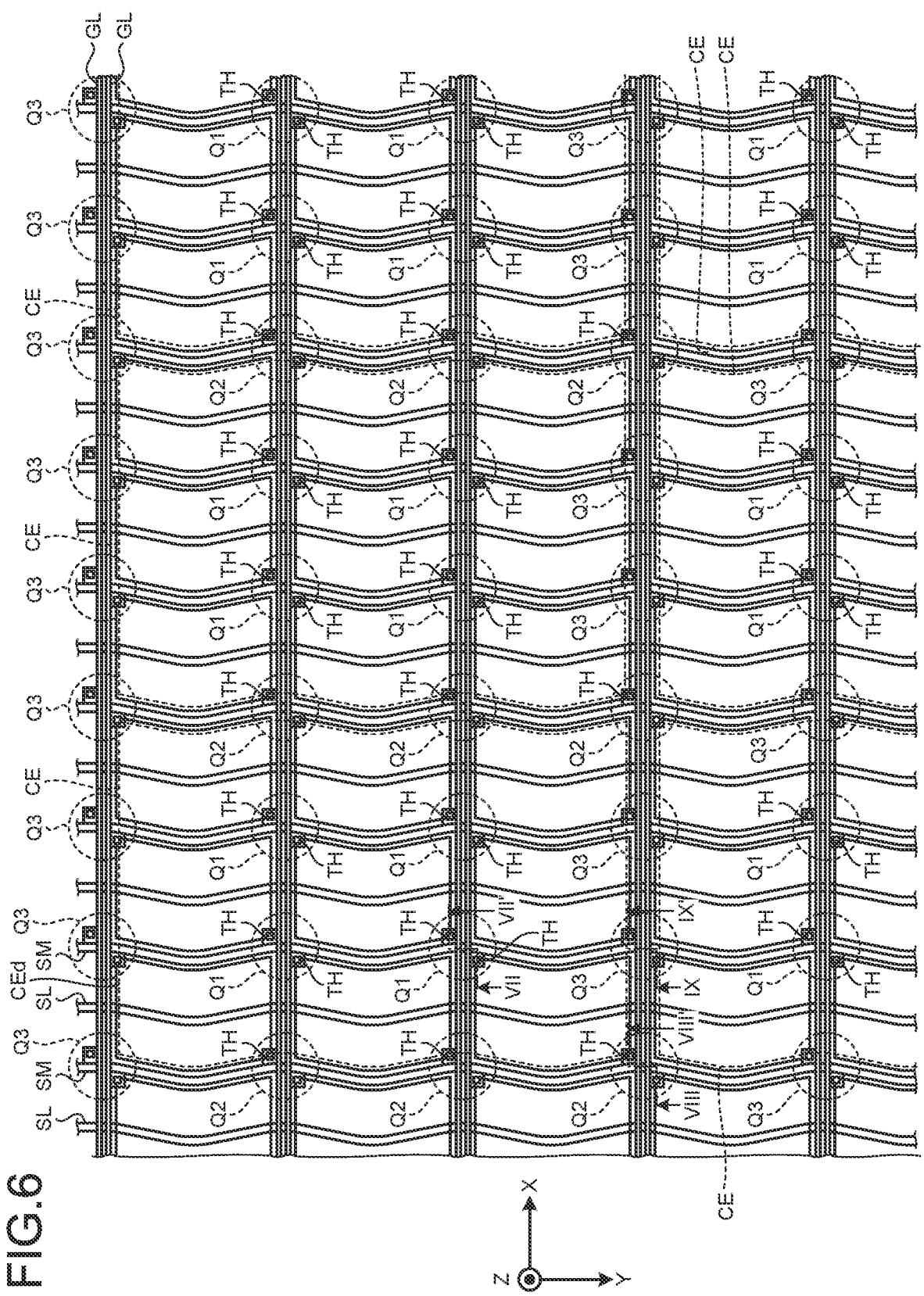
FIG. 6 is a diagram for explaining coupling positions between the sensor wires and the detection electrodes.
Figure 7:
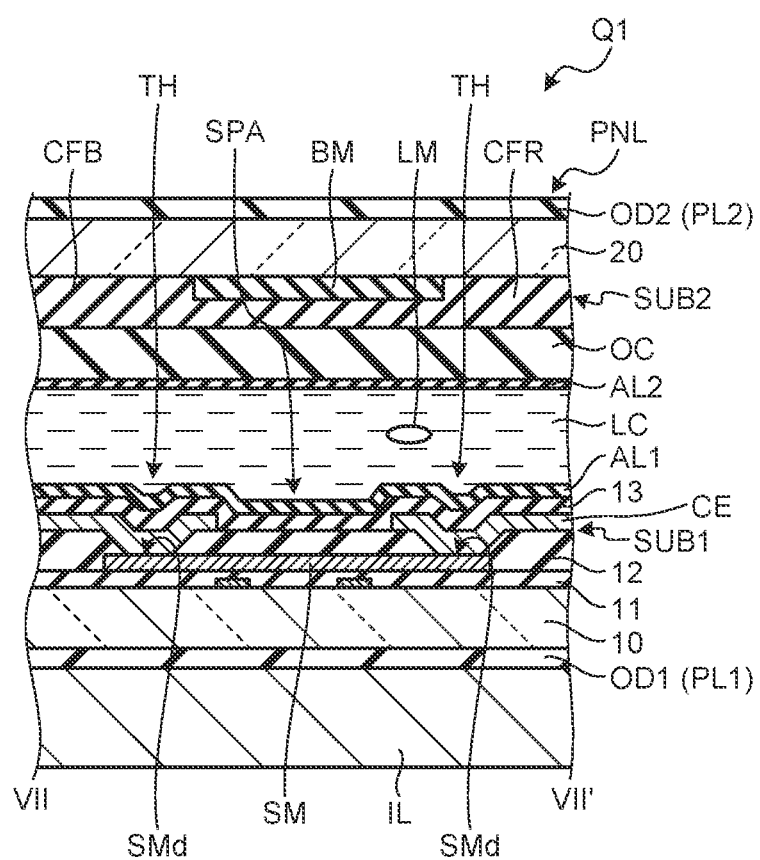
FIG. 7 is a partial sectional view for explaining the VII-VII' section in FIGS. 4 and 6.
Figure 8:
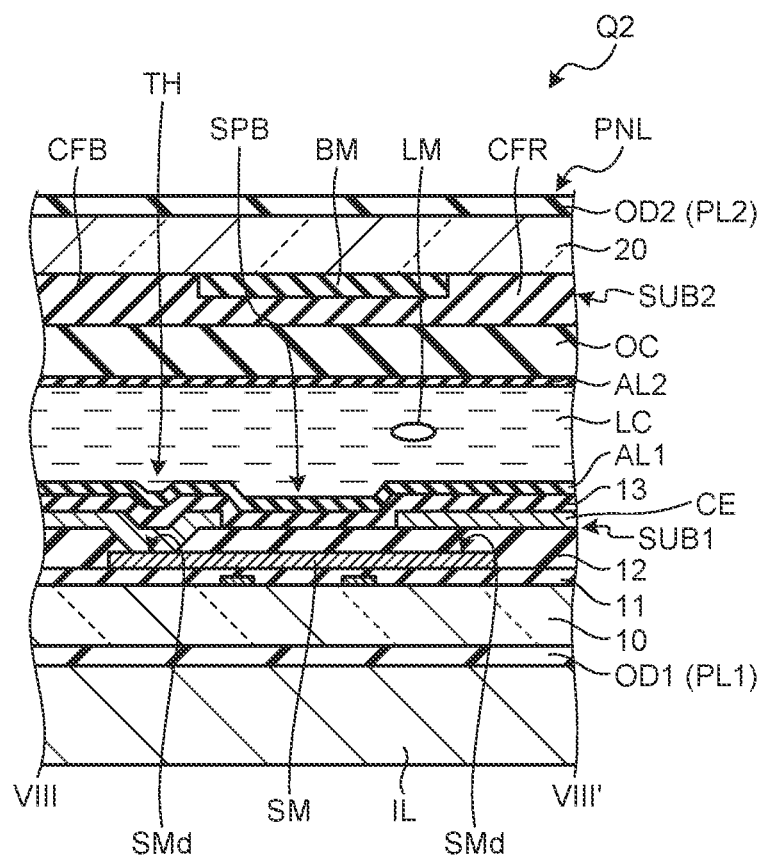
FIG. 8 is a partial sectional view for explaining the VIII-VIII' section in FIG. 6.
Figure 9:
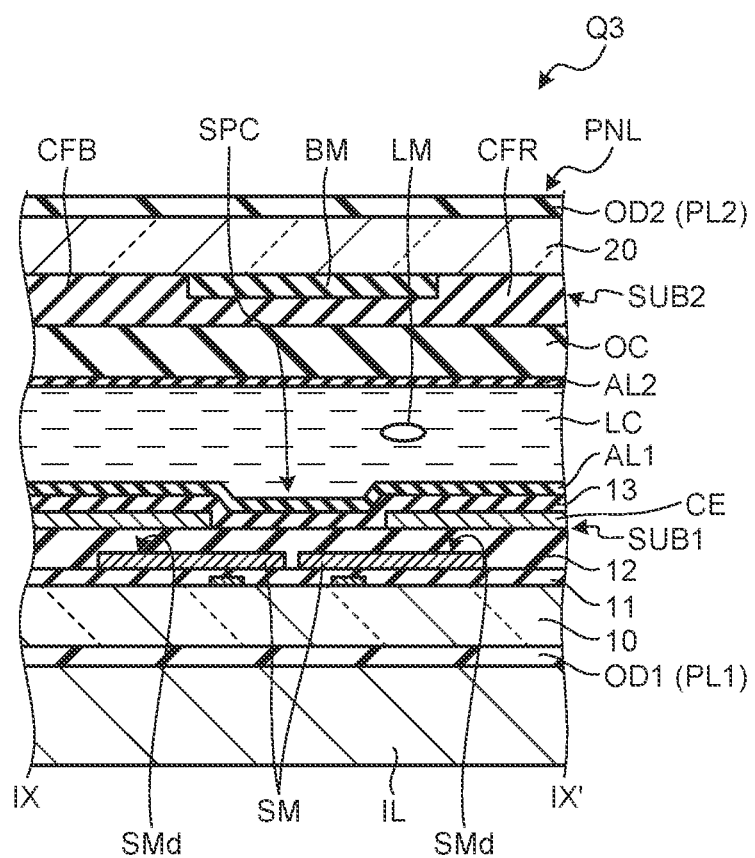
FIG. 9 is a partial sectional view for explaining the IX-IX' section in FIG. 6.

FIG. 4 is a plan view for explaining the positions of sensor wires and signal lines in a schematic plan view of pixels. FIG. 5 is a partial sectional view for explaining the V-V' section in FIG. 4. FIG. 6 is a diagram for explaining coupling positions between the sensor wires and the detection electrodes. FIG. 7 is a partial sectional view for explaining the VII-VII' section in FIGS. 4 and 6. FIG. 8 is a partial sectional view for explaining the VIII-VIII' section in FIG. 6. FIG. 9 is a partial sectional view for explaining the IX-IX' section in FIG. 6. The following describes the specific display device with a sensor PNL according to the present embodiment with reference to FIGS. 1 to 9.

As illustrated in FIG. 5, the signal line SL1, the pixel electrodes PE, the detection electrodes CE, and the sensor wires SM are provided above a first insulating substrate 10 (hereinafter may also be simply referred to as the first substrate). In the following description, the sensor wires SM may also be collectively referred to as the sensor wires SM. As illustrated in FIG. 4, the scanning lines G1 to G3 extend along the first direction X and are disposed side by side at regular pitches in the second direction Y. Although not illustrated in FIG. 5, the scanning lines G1 to G3 are also provided above the first insulating substrate 10.

In FIG. 4, the direction D1 is defined as a direction intersecting the second direction Y counter-clockwisely at an acute angle, and the direction D2 is defined as a direction intersecting the second direction Y clockwisely at an acute angle. An angle 81 between the second direction Y and the direction D1 is substantially equal to an angle 82 between the second direction Y and the direction D2. The signal lines SL extend approximately along the second direction Y and are disposed side by side at regular pitches in the first direction X. In the illustrated example, between the two scanning lines GL, the signal lines SL extends in the direction D1 and change the direction to extend in the direction D1. The scanning lines GL and the signal line SL intersect each other in a plan view of the X-Y plane.

As illustrated in FIG. 5, the signal line SL1, the pixel electrodes PE, the detection electrodes CE, and the sensor wires SM are provided above the first insulating substrate 10. As illustrated in FIG. 4, the scanning lines GL extend along the first direction X and are disposed side by side at regular pitches in the second direction Y. Although not illustrated in FIG. 5, the scanning lines GL are also provided above the first insulating substrate 10.

As illustrated in FIG. 4, the switching elements Tr are positioned near the intersections of the scanning lines GL and the signal lines SL and electrically coupled to the scanning lines GL and the signal lines SL.

As illustrated in FIG. 5, the pixel electrodes PE are disposed side by side in the first direction X with gaps interposed therebetween. The pixel electrodes PE are positioned between the signal line SL1 and the sensor wires SM. The pixel electrodes PE each have a contact part PA1, electrode parts PB1, and connecting parts PC1. The contact part PA1 is electrically coupled to the switching element Tr. The electrode parts PB1 extend from the contact part PA1 to the side closer to one of the scanning lines GL, which is the opposite side to the other scanning line GL. The electrode parts PB1 may also be referred to as a strip electrode, a linear electrode, or a comb electrode, for example. In FIG. 4, one pixel electrode PE includes eight electrode parts PB1. Two of the electrode parts PB1 are coupled to the contact part PA1. The electrode parts PB1 are disposed side by side in the first direction X with gaps interposed therebetween. The connecting parts PC1 are connected to the ends of the eight electrode parts PB1. If one of the electrode parts PB1 is broken, this configuration can supply a pixel potential to the broken electrode part PB1 from the remaining electrode parts PB1 via the connecting parts PC1.

The shape of the pixel electrodes PE is not limited to those in the example illustrated in FIG. 4. The pixel electrodes PE may omit one of the connecting parts PC1, and the number of electrode parts PB1 is not necessarily eight, but may be two, three, or four, for example.

The pixel electrodes PE disposed side by side in the first direction X are provided in such a way that the substantially identical shapes thereof are linearly symmetrical with respect to a predetermined line in the second direction Y.

The sensor wires SM each are located between the two signal lines SL disposed side by side in the first direction X in the plan view of the X-Y plane, and extend in the second direction Y same as the signal lines SL.

In FIG. 5, the array substrate SUB1 includes the translucent first insulating substrate 10, such as a glass substrate and a resin substrate, serving as a base. The array substrate SUB1 includes a first insulating layer 11, a second insulating layer 12, a third insulating layer 13, the signal line SL1, the pixel electrodes PE, the detection electrodes CE, a first orientation film AL1, and other components on the first insulating substrate 10 on the side facing the counter substrate SUB2. In the following description, a direction from the array substrate SUB1 to the counter substrate SUB2 is referred to as above or simply referred to as up.

Although not illustrated in the cross section of FIG. 5, the scanning lines GL and gate electrodes GE (refer to FIG. 4) are provided on the first insulating substrate 10, and the first insulating layer 11 illustrated in FIG. 5 covers the scanning lines GL and the gate electrodes GE (refer to FIG. 4). Under the first insulating layer 11, the scanning lines GL, and the gate electrodes GE, there may be a further insulating layer made from a translucent inorganic material, such as silicon oxide or silicon nitride.

Although not illustrated in the cross section of FIG. 5, semiconductor layers SC (refer to FIG. 4) are laminated on the first insulating layer 11. While the semiconductor layers SC are made from amorphous silicon, for example, they may be made from polysilicon or an oxide semiconductor, for example.

As illustrated in FIG. 5, the second insulating layer 12 covers the signal line SL and the sensor wires SM. The second insulating layer 12 is made from a translucent resin material such as acrylate resin and has a thickness larger than those of the other insulating films made from the inorganic material. The second insulating layer 12, however, may be made from an inorganic material.

Although not illustrated in the cross section of FIG. 5, source electrodes SE covering a part of the semiconductor layers SC and drain electrodes DE covering a part of the semiconductor layers SC are provided on the second insulating layer 12. The drain electrodes DE are made from the same material as the signal lines SL. The third insulating layer 13 is provided on the semiconductor layers SC and the drain electrodes DE.

As illustrated in FIG. 4, the source electrodes SE each have the two conductors same as the signal line SL and extend from the signal line SL in the same layer and in the first direction X. Consequently, the source electrodes SE electrically coupled to the signal line SL are superimposed on one end of the respective semiconductor layers SC in a plan view.

As illustrated in FIG. 4, the drain electrodes DE each are provided at the position between the conductors of the source electrodes SE disposed side by side in a plan view. The drain electrodes DE are superimposed on the respective semiconductor layers SC in a plan view. The portion not superimposed on the source electrode SE and drain electrode DE functions as the channel of the switching element Tr. As illustrated in FIG. 4, the contact part PA1, which is electrically coupled to the drain electrode DE, is electrically coupled to the pixel electrode PE by a contact hole. While the above-described switching element Tr is a bottom-gate element, it may be a top-gate element.

As illustrated in FIG. 5, the sensor wires SM are positioned on the first insulating layer 11. The sensor wires SM are made from a metal material including any one of Al, Mo, and W and having a lower resistance than those of the detection electrodes CE. The sensor wires SM are provided on the same layer as the signal line SL and are made from the same material as the signal line SL.

The detection electrodes CE are positioned on the second insulating layer 12. In FIG. 5, the detection electrode CE faces the signal line SL with the third insulating layer 13 interposed therebetween. The third insulating layer 13 is made from a translucent inorganic material, such as a silicon oxide or a silicon nitride.

In FIG. 5, the slits SPA between the respective detection electrodes CE are positioned right above the respective sensor wires SM. In other words, the sensor wires SM are superimposed on the respective slits of the two detection electrodes disposed side by side in the first direction.

The detection electrodes CE are covered by the third insulating layer 13. The third insulating layer 13 is made from a translucent inorganic material, such as a silicon oxide or a silicon nitride.

The pixel electrodes PE are positioned on the third insulating layer 13 and face the detection electrodes CE with the third insulating layer 13 interposed therebetween. The pixel electrodes PE and the detection electrodes CE are made from a translucent conductive material, such as ITO and indium zinc oxide (IZO). The pixel electrodes PE are covered by the first orientation film AL1. The first orientation film AL1 also covers the third insulating layer 13.

The counter substrate SUB2 includes a translucent second insulating substrate 20, such as a glass substrate and a resin substrate, serving as a base. The counter substrate SUB2 includes light-shielding layers BM, the color filters CFR, CFG, and CFB, an overcoat layer OC, a second orientation film AL2, and other components on the second insulating substrate 20 on the side facing the array substrate SUB1.

As illustrated in FIG. 5, the light-shielding layers BM are positioned on the second insulating substrate 20 on the side facing the array substrate SUB1. As illustrated in FIG. 5, the light-shielding layers BM define openings AP facing the respective pixel electrodes PE. The light-shielding layers BM are made from a black resin material or a light-shielding metal material.

The color filters CFR, CFG, and CFB are positioned on the second insulating substrate 20 on the side facing the array substrate SUB1. Ends of the color filters CFR, CFG, and CFB overlap the respective light-shielding layers BM. The color filters CFR, CFG, and CFB are made from resin materials in red, green, and blue, respectively, for example.

The overcoat layer OC covers the color filters CFR, CFG, and CFB. The overcoat layer OC is made from a translucent resin material. The second orientation film AL2 covers the overcoat layer OC. The first orientation film AL1 and the second orientation film AL2 are made from a horizontally oriented material, for example.

As described above, the counter substrate SUB2 includes the light-shielding layers BM, the color filters CFR, CFG, and CFB, and other components. The light-shielding layers BM each are disposed in a region facing the wiring, such as the scanning line GL, the signal line SL, the contact part PA1, and the switching element Tr illustrated in FIG. 4.

While the counter substrate SUB2 includes the color filters CFR, CFG, and CFB in three colors in FIG. 5, it may include color filters in four or more colors different from blue, red, and green, such as white, transparent, yellow, magenta, and cyan. The color filters CFR, CFG, and CFB may be provided to the array substrate SUB1.

The array substrate SUB1 and the counter substrate SUB2 are disposed with the first orientation film AL1 and the second orientation film AL2 facing each other. The liquid crystal layer LC is sealed between the first orientation film AL1 and the second orientation film AL2. The liquid crystal layer LC is made from a negative liquid crystal material having negative dielectric anisotropy or a positive liquid crystal material having positive dielectric anisotropy.

The array substrate SUB1 faces a backlight unit IL, and the counter substrate SUB2 is positioned on the display surface side. The backlight unit IL may have various kinds of forms, and a detailed explanation of the configuration of the backlight unit IL is omitted.

A first optical element OD1 including a first polarizing plate PL1 is disposed on the outer surface of the first insulating substrate 10 or the surface facing the backlight unit IL. A second optical element OD2 including a second polarizing plate PL2 is disposed on the outer surface of the second insulating substrate 20 or the surface on the observation position side. A first polarization axis of the first polarizing plate PL1 and a second polarization axis of the second polarizing plate PL2 are in a cross-Nicol positional relation on the X-Y plane, for example. The first optical element OD1 and the second optical element OD2 may include other optical functional elements, such as a phase-contrast plate.

In a case where the liquid crystal layer LC is made of a negative liquid crystal material, for example and no voltage is applied to the liquid crystal layer LC, liquid crystal molecules LM are initially oriented with their long axes extending along the first direction X on the X-Y plane. By contrast, when a voltage is applied to the liquid crystal layer LC, that is, in an on-state when an electric field is formed between the pixel electrodes PE and the detection electrodes CE, the orientation state of the liquid crystal molecules LM changes because of the effects of the electric field. In the on-state, the polarization state of incident linearly polarized light changes depending on the orientation state of the liquid crystal molecules LM when passing through the liquid crystal layer LC.

As illustrated in FIG. 6, the detection electrodes CE each are electrically coupled to a plurality of small detection electrodes CEd. The small detection electrodes CEd are provided on substantially the whole display region DA (refer to FIG. 1) of the array substrate SUB1. In other words, the sub-pixels Spix include the pixel electrodes PE, and the small detection electrodes CEd (detection electrodes CE) are provided in a region overlapping the pixel electrodes PE. In the plan view of the X-Y plane, the signal lines SL each are superimposed on the respective small detection electrodes CEd that straddle the two sub-pixels SPix.

As illustrated in FIGS. 4 and 7, the sensor wires SM each have the base part SMd for coupling with the small detection electrode CEd. The base parts SMd each protrude from the respective sensor wires SM into the sub-pixel SPix. The base parts SMd are provided simultaneously with the respective sensor wires SM and made from the same material as those of the sensor wires SM. The slits between the respective small detection electrodes CEd disposed side by side in the first direction are superimposed on the respective sensor wires SM and extend in the second direction.

Since the sensor wires SM are superimposed on the respective slits SPA of the small detection electrodes CEd, the sensor wires SM themselves cannot couple the small detection electrodes CEd disposed side by side. Therefore, the sensor wires SM electrically couple the respective small detection electrodes CEd via the respective base parts SMd.

As illustrated in FIGS. 4 and 7, when the small detection electrodes CEd and the base part SMd are electrically coupled via the contact hole TH, electrical coupling between the sensor wires SM and the detection electrodes CE is created.

There are two base parts SMd in the vicinity of the intersection where one of the scanning lines GL and one of the signal lines SL intersect in a plan view. One base part SMd is disposed in a rotationally symmetrical position around the above-described intersection with respect to the other base part SMd. This makes it easier to widen the opening of the sub-pixel SPix, since the base part SMd is aligned with the switching element Tr in the first direction in the sub-pixel SPix. Consequently, the display quality is improved. In the present embodiment, there are three electrical coupling patterns between the small detection electrodes CEd and the base parts SMd at this intersection, as illustrated in FIGS. 7 to 9.

In a first coupling pattern Q1 illustrated in FIGS. 6 and 7, the two base parts SMd in the vicinity of the intersection where the scanning line GL intersects the signal line SL are electrically coupled to the small detection electrodes CEd via a contact hole TH, respectively.

In a second coupling pattern Q2 illustrated in FIGS. 6 and 8, only one of the two base parts SMd in the vicinity of the intersection where the scanning line GL and the signal line SL intersect is electrically coupled to the small detection electrodes CEd via the contact hole TH.

In a third coupling pattern Q3 illustrated in FIGS. 6 and 9, none of the two base parts SMd in the vicinity of the intersection where the scanning line GL and the signal line SL intersect is electrically coupled to the small detection electrodes CEd via the contact hole TH. The sensor wires SM are electrically divided by the slits SPC.

The sensor wires SM are electrically divided by the slits SPC between the detection electrodes CE disposed side by side. This configuration reduces parasitic capacitance generated between the detection electrodes CE and the sensor wires SM and improves the accuracy in detecting the capacitance.

As illustrated in FIG. 6, the first coupling pattern Q1, the second coupling pattern Q2, and the third coupling pattern Q3 are combined to electrically couple three small detection electrodes CEd in the first direction X and couple three small detection electrodes CEd in the second direction Y. In other words, in the present embodiment, the detection electrode CE consists of a plurality of small detection electrodes CEd, that is, three small detection electrodes CEd electrically coupled in the first direction X and three small detection electrodes CEd electrically coupled in the second direction Y.

In the second coupling pattern Q2 and the third coupling pattern Q3, there is also a base part SMd without contact hole TH. This allows the base part SMd to be distributed evenly within the display region DA. Consequently, there is less variation in light-shielding, which reduces the deterioration of display quality.

In the above-described display device with a sensor PNL, the display period and the detection period are executed alternately in a time-sharing manner. The display device with a sensor PNL may perform touch detection on one detection surface in one detection period or a plurality of detection periods in a divided manner. The display device with a sensor PNL may display an image of one frame in one display period or perform a plurality of display periods and detection periods alternately in a display period for an image of one frame.

In the detection period, the integrated circuit CP and the coupling circuit MP (refer to FIG. 2) operate based on a control signal and supply detection drive signals to the detection electrodes CE. In the detection period, the outer edge wiring DE-G illustrated in FIG. 1 may be supplied with guard signals having the same waveform as those of the detection drive signals and synchronized with the drive signals. Alternatively, in the detection period, the outer edge wiring DE-G may be brought into a state of not being electrically coupled to any component (high impedance).

Detection signals corresponding to capacitance changes in the detection electrodes CE are supplied to a detection circuit of the integrated circuit CP via the analog front ends of the coupling circuit MP. The display device with a sensor PNL thus can detect an object to be detected in a contact state or a proximity state in units of a plurality of detection electrodes CE. Because the specific detection method is described in Japanese Patent Application Laid-open Publication No. 2018-060156 A, an explanation of the detection method is omitted herein by mentioning Japanese Patent Application Laid-open Publication No. 2018-060156 A in the present embodiment.

As described above, the display device with a sensor PNL includes the detection electrodes CE, the sensor wires SM, the pixels Pix, the scanning lines GL, and the signal lines SL on the first insulating substrate 10. The detection electrodes CE are arrayed in a matrix (row-column configuration) in the first direction X and the second direction Y intersecting the first direction X. The scanning lines GL scan the switching elements Tr and extend in the first direction X. The signal lines SL are coupled to the switching elements Tr and extend in the second direction Y. The sensor wires SM each are between the sub-pixels SPix disposed side by side in the first direction X. The sensor wires SM and the signal lines SL are disposed alternately in the first direction X. Even if the sensor wires SM are superimposed on the slit SPAs of the two detection electrodes CE disposed side by side in the first direction X, the sensor wires SM and the signal lines SL are provided on the same layer in the third direction Z, so that the influence of the driving of the sensor wires SM is unlikely to affect the display quality.

In addition, since the signal lines SL each are superimposed on the respective detection electrodes CE that straddle two sub-pixels SPix disposed side by side in the first direction, the influence of light leakage caused by the signal line SL is reduced.

A plurality of sensor wires SM are electrically coupled to one of the detection electrodes CE. The configuration in which a plurality of sensor wires SM are electrically coupled to one of the detection electrodes CE can reduce wiring resistance, thereby suppressing waveform deterioration in the drive signals supplied to the detection electrodes CE. Consequently, the display device with a sensor PNL can detect the capacitance with higher accuracy.

Since the sensor wires SM are not superimposed on the signal lines SL, the thickness of the insulating layer covering the sensor wires SM and the signal lines SL can be made thinner.

The sensor wires SM each have a coupling part that protrudes into the sub-pixel SPix and couples to the small detection electrodes CEd. The coupling part refers to the configuration where the small detection electrode CEd and the base part SMd are electrically coupled via the contact hole TH. Since the sensor wires SM are superimposed on the respective slits SPA of the small detection electrodes CEd, the sensor wires SM themselves cannot couple the small detection electrodes CEd disposed side by side. Therefore, the sensor wires SM electrically couple the respective small detection electrodes CEd via the respective base parts SMd. This allows the detection electrodes CE to have the desired area.

As illustrated in FIG. 6, a plurality of contact holes TH are formed between one of the detection electrodes CE and one of the sensor wires SM, for example. This configuration can reduce coupling resistance, thereby suppressing waveform deterioration in the drive signals supplied to the detection electrodes CE. Consequently, the display device with a sensor PNL can detect the capacitance with higher accuracy.

While exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

The base part SMd, for example, may be referred to as any one of relay electrodes, coupling electrodes, wide parts, expanded parts, and widened parts or simply referred to as first parts of the sensor wires SM, for example.

While the plane defined by the first direction X and the second direction Y is parallel to the surface of the array substrate SUB1, the surface of the array substrate SUB1 may be curved. In this case, viewed in a direction in which the display device with a sensor PNL has the largest area, a certain direction is the first direction, and a direction intersecting the first direction is the second direction. The direction in which the display device with a sensor PNL has the largest area is defined as the third direction orthogonal to the first direction and the second direction.

What is claimed is:

1. A display device with a sensor comprising:
a first substrate;
a plurality of detection electrodes arrayed in a matrix in a first direction and a second direction intersecting the first direction above the first substrate;
a plurality of sensor wires each coupled to the respective detection electrodes;
a plurality of pixels each including a plurality of pixels and arrayed in a matrix in the first direction and the second direction;
a plurality of scanning lines configured to scan switching elements of the pixels and extending in the first direction; and
a plurality of signal lines coupled to the switching elements of the pixels and extending in the second direction, wherein
the sensor wires and the signal lines are alternately disposed in the first direction and provided in a same layer,
the switching elements of two of the pixels are disposed side by side in the first direction, the signal line is superimposed on the corresponding detection electrode that straddles the two pixels, and
the sensor wires are disposed between the two pixels disposed side by side in the first direction and superimposed on respective slits of two of the detection electrodes disposed side by side in the first direction.

2. The display device with the sensor according to claim 1, wherein the sensor wires each have a base part protruding into the pixel for coupling with the detection electrodes.

3. The display device with the sensor according to claim 2, wherein
there are two base parts in the vicinity of the intersection where one of the scanning lines and one of the signal lines intersect, and
one of the two base parts is disposed in a rotationally symmetrical position around the intersection with respect to the other base part.

4. The display device with the sensor according to claim 3, wherein
the detection electrodes each have a plurality of small detection electrodes, and
the display device includes:
a first coupling pattern in which the two base parts in the vicinity of the intersection are electrically coupled to one of the small detection electrodes via a contact hole,
a second coupling pattern in which only one of the two base parts in the vicinity of the intersection is electrically coupled to one of the small detection electrodes via the contact hole, and
a third coupling pattern in which none of the two base parts in the vicinity of the intersection is electrically coupled to one of the small detection electrodes via the contact hole.

5. The display device with the sensor according to claim 4, wherein there is a base part without contact holes in the second and third coupling patterns.

6. The display device with the sensor according to claim 4, wherein in a plan view, the signal lines each are superimposed on the small detection electrodes that straddle two sub-pixels included in the pixel.

7. The display device with the sensor according to claim 1, wherein the sensor wires are electrically coupled to one of the detection electrodes.

8. The display device with the sensor according to claim 1, wherein the slits extend in the second direction.

9. A display device with a sensor comprising:
a first insulating substrate;
a first insulating layer;
a second insulating layer;
a plurality of detection electrodes arrayed in a matrix in a first direction and a second direction intersecting the first direction;
a first signal line;
a second signal line provided next to the first signal line in the first direction; and
a first sensor wire provided between the first signal line and the second signal line in the first direction,
wherein
a bottom surface of the first insulating layer faces the first insulating substrate,
a top surface of the first insulating layer faces the second insulating layer, the top surface being an opposite side of the bottom surface of the first insulating layer,
the first signal line is in contact with the top surface of the first insulating layer,
the second signal line is in contact with the top surface of the first insulating layer,
the first sensor wire is in contact with the top surface of the first insulating layer,
the plurality of detection electrodes includes
a first detection electrode and
a second detection electrode provided next to the first detection electrode in the first direction,
the first sensor wire is provided between the first detection electrode and the second detection electrode in the first direction,
the first detection electrode is separated from the second detection electrode in the first direction, the first detection electrode and the second detection electrode being above the first sensor wire,
the first sensor wire includes a line portion and a first base part,
the line portion has a first width in the first direction,
the first base part has a second width in the first direction,
the second width is larger than the first width, and
the first base part of the first sensor wire is connected to the first detection electrode via a first contact hole formed in the second insulating layer.

10. The display device with the sensor according to claim 9, wherein
the first signal line overlaps the first detection electrode, and
the second signal line overlaps the second detection electrode.

11. The display device with the sensor according to claim 10, wherein the second detection electrode has a plurality of slits.

12. The display device with the sensor according to claim 11, wherein
the first sensor wire further includes a second base part,
the second base part has a third width in the first direction,
the third width is larger than the first width,
the second base part overlaps the third detection electrode,
the second insulating layer covers an entirety of the second base part, and
the third detection electrode is not connected to the first sensor wire.

13. The display device with the sensor according to claim 11, wherein
the second insulating layer is an organic material,
the first sensor wire is in contact with a bottom surface of the second insulating layer, and
the detection electrodes are provided above a top surface of the second insulating layer.

14. The display device with the sensor according to claim 11, wherein
the second insulating layer is an inorganic material,
the first sensor wire is in contact with a bottom surface of the second insulating layer, and
the detection electrodes are provided above a top surface of the second insulating layer.

15. The display device with the sensor according to claim 10, wherein
the detection electrodes further include a third detection electrode,
the third detection electrode is provided next to the second detection electrode in the second direction, and
the second detection electrode is separated from the third detection electrode in the second direction.

* * * * *